United States Patent [19]

Joyce et al.

[11] 4,347,110

[45] Aug. 31, 1982

[54] METHOD FOR TALL OIL RECOVERY AND APPARATUS THEREFOR

[75] Inventors: Edward R. Joyce; William L. Smith, both of Jacksonville, Fla.

[73] Assignee: SCM Corporation, New York, N.Y.

[21] Appl. No.: 210,221

[22] Filed: Nov. 25, 1980

Related U.S. Application Data

[63] Continuation-in-part of Ser. No. 168,375, Jul. 10, 1980, abandoned.

[51] Int. Cl.³ ............................ C02F 1/46; C02F 1/48; C25B 9/00; B03C 5/00
[52] U.S. Cl. .................................... 204/149; 204/186; 204/302; 204/275; 210/748
[58] Field of Search ........... 204/149, 302, 167, 180 R, 204/299 R, 186, 270, 269, 275; 210/44, 50, 748; 55/127

[56] References Cited

U.S. PATENT DOCUMENTS

| 3,129,157 | 4/1964 | Loeckenhoff | 204/299 R X |
|---|---|---|---|
| 3,247,091 | 4/1966 | Stuetzer | 204/302 X |
| 3,356,603 | 12/1967 | Drew | 204/167 |
| 3,398,077 | 8/1968 | Crownover et al. | 204/299 R X |
| 3,478,494 | 11/1969 | Lustenader et al. | 55/127 |
| 3,687,834 | 8/1972 | Candor | 204/299 R X |
| 4,098,673 | 7/1978 | Zucker | 204/167 X |

OTHER PUBLICATIONS

Modern Dictionary of Electronics, Graf, p. 316.

Primary Examiner—Howard S. Williams
Attorney, Agent, or Firm—Robert A. Sturges; Merton H. Douthitt

[57] ABSTRACT

A system and apparatus are disclosed for removing particles from suspension in a liquid, particularly for removing tall oil soap particles from black liquor. The black liquor flows along a fluid flow path (10) which runs between a source of black liquor and a skimming tank. Two electrodes (16, 18) are disposed one downstream of the other within the fluid flow path (10). A power supply (26) applies an electrical potential between the electrodes (16, 18). The downstream electrode (18) is connected to earth ground (36). It has been found that this earth ground connection (36) provides substantial improvements in the quality and quantity of recovered tall oil soap.

12 Claims, 4 Drawing Figures

METHOD FOR TALL OIL RECOVERY AND APPARATUS THEREFOR

This application is a continuation-in-part of application Ser. No. 168,375, filed July 10, 1980, now abandoned.

BACKGROUND AND FIELD OF THE INVENTION

The present invention relates to a system and apparatus for removing particulate matter from liquid suspension, and more particularly to an improved method and apparatus for recovering tall oil soap particles from black liquor produced from wood pulping processes.

A by-product of the wood pulping industry is a black, viscous substance known as "black liquor" which is obtained from pulp digested via pulp washers and/or evaporators. This black liquor is typically burned in order to recover its soda value which is then in turn reused in the wood pulping process. Suspended in this black liquor are tall oil soap particles which are useful in their own right in other industries. Consequently, it has been the practice to recover as much of the tall oil soap particles as possible before burning the black liquor.

Tall oil soap is recovered from the black liquor by feeding the black liquor into a skimming tank, where the tall oil soap particles float to the surface of the liquor and may be skimmed off. Since, for efficiency of operation, the black liquor cannot be held in the skimming tanks for too great a period of time, some of the tall oil soap particles which are suspended in the black liquor never reach the surface of the liquor before being drained from the tank. Although this residue is fairly small, when viewed on a cumulative basis it represented a significant loss in tall oil soap.

To reduce the amount of tall oil soap lost in this fashion, systems have been suggested for enhancing the agglomeration of the tall oil soap particles prior to their entry into the skimming tank. Since the rate of ascent of these particles is approximately proportional to their size, the agglomeration of the soap particles into larger particles results in a larger portion of these particles reaching the surface of the skimming tanks during the retention of the black liquor in the tanks.

Methods for improving the agglomeration of the tall oil soap particles are disclosed in the patents to Drew, U.S. Pat. No. 3,356,603 and Zucker, U.S. Pat. No. 4,098,673. Each of these patents discloses applying an electrical potential across two electrodes which are immersed within the black liquor so as to encourage the agglomeration of the tall oil soap particles. Zucker, more specifically, discloses disposing the electrodes within the pipe line which carries the black liquor to the skimming tank. The two electrodes are insulated from one another and a D.C. potential applied across them. The polarity of this D.C. potential is such that the upstream electrode is positive and the downstream electrode is negative. According to the Zucker patent, this arrangement produces improved tall oil recovery.

SUMMARY OF THE INVENTION

It has now been found that the apparatus of the prior art may be substantially improved by simply connecting the downstream (negative) electrode or pipe section containing such electrode to earth ground. This simple change produces the surprising and unexpected results of not only improving the yield of tall oil soap but also of improving the density of the recovered tall oil soap, thereby permitting simplified handling, storage, etc. of the tall oil soap.

The present invention provides, more specifically, an improvement for use in a system for removing particles from a liquid, wherein the system comprises means for providing a flow path for a stream of the liquid, first and second electrodes disposed in the flow path, with the first electrode being located upstream of and electrically isolated from the second electrode, and means for applying an electrical potential across the electrodes so as to cause the particles in the liquid to agglomerate. The improvement comprises the inclusion of means for connecting the second electrode to earth ground.

BRIEF DESCRIPTION OF THE DRAWINGS

The foregoing aspects and advantages of the present invention will become more readily apparent from the following detailed description, as taken in conjunction with the accompanying drawings, wherein.

DETAILED DESCRIPTION

Although the following description will largely be made with reference to a method of improving recovery of tall oil soap from the black liquor which is produced as a by-product of the wood pulping process, it will be appreciated that this method may similarly be used in other applications requiring the agglomeration of particles carried in liquid suspension.

Figure 1:
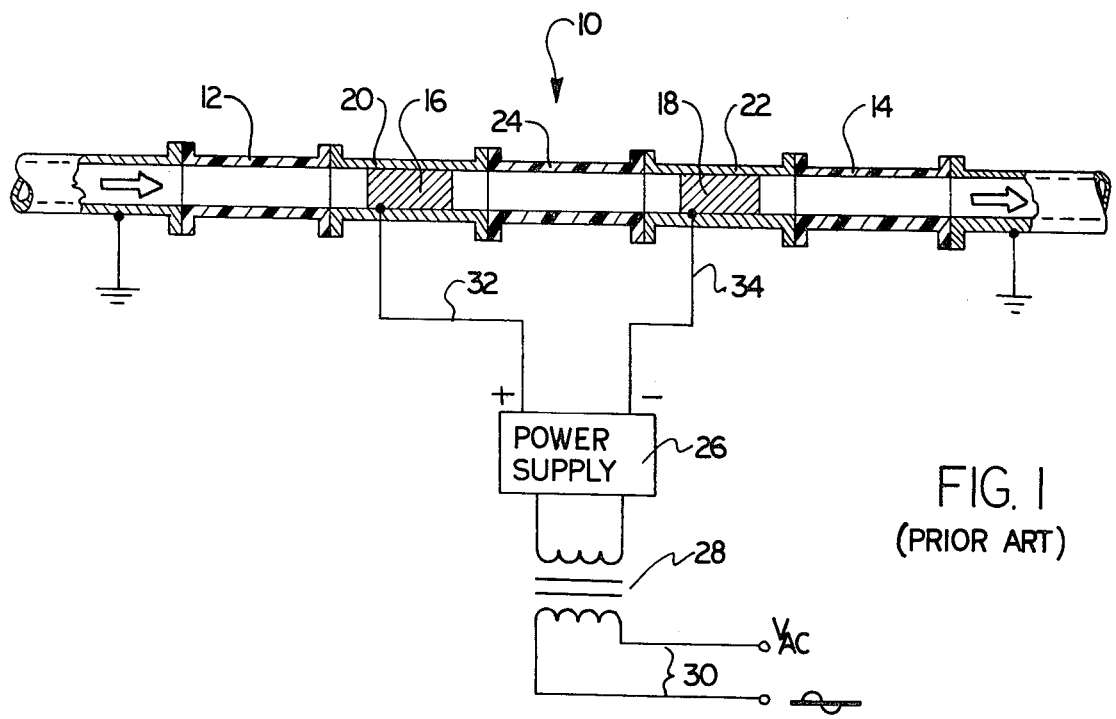
FIG. 1 is a schematic illustration of a prior art system for enhancing agglomeration of particles in a liquid through application of an electrostatic potential thereacross.

FIG. 1 is a schematic representation of prior art apparatus for applying an electrostatic potential across black liquor in order to encourage agglomeration of the tall oil soap particles carried therein. In this Figure, the pipeline 10 includes an inlet Section 12 for receiving the black liquor from a source, such as a wood pulp washer or evaporator, and an outlet 14 for carrying the electrostatically processed black liquor to a skimming tank for skimming the tall oil soap particles from the black liquor.

Interposed between the inlet and outlet sections 12 and 14 are the pipeline sections which support the electrodes 16 and 18 within the flow path of the black liquor. Both of these electrodes 16 and 18 are mounted within corresponding pipeline segments 20 and 22 constructed of cast iron or carbon steel. The electrodes themselves are electrically conductive, in contact with the metallic pipe section, and are constructed in a conventional corrugated form so as to present a high surface area to the black liquor flow. In the FIG. 1 drawing the two pipe segments 20 and 22 are separated by a third, insulating pipeline section 24, (e.g., fiberglass reinforced resin). Since the large surface area electrodes 16 and 18 are disposed within conductive pipeline sections, separated by the insulating section 24, the two are electrically isolated from one another, permitting the application of a D.C. electrical potential across them. To this end, a power supply 26 is provided. This power supply receives its electrical power from an isolation transformer 28 which isolates the power supply 26 from the A.C. power lines, indicated generally at 30. The power supply 26 has positive and negative output lines, with the positive line 32 being connected to the upstream electrode 16 and the negative line 34 being connected to the downstream electrode 18. An A.C. potential may be superimposed upon this D.C. potential in the fashion indicated in the aforementioned Zucker patent. Other known elements (not shown) may be included for introducing air into the black liquor and/or agitating the liquor upstream of the electrode 16.

In operation, the black liquor enters the apparatus through the inlet 12, acquires a positive charge as it passes through the positive electrode 16, gives up this charge at the negative electrode 18, and exits from the system to the skimming tank through the outlet 14. This process encourages the agglomeration of the tall oil soap particles by providing some of the soap particles (which are anionic) with a positive charge. The electrostatic difference in potential between those particles which have been given a positive charge and other particles within the fluid causes them to be electrostatically attracted to one another, thus producing the agglomeration of the particles.

Figure 2:
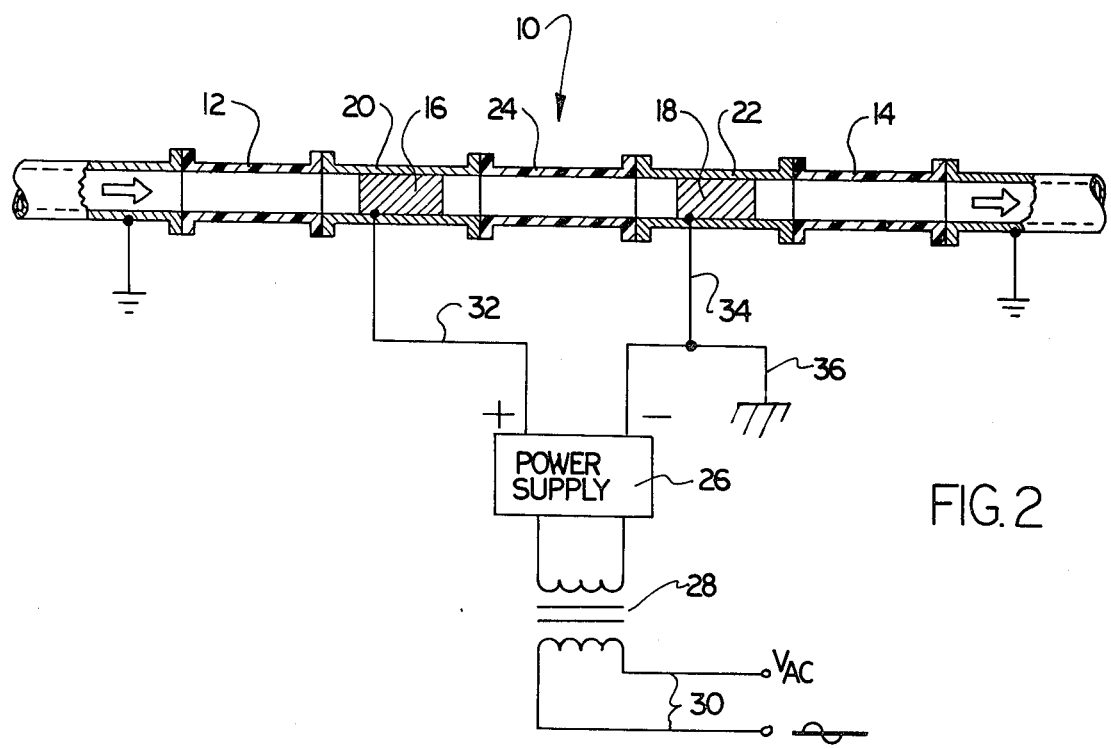
FIG. 2 is a schematic illustration of the system of FIG. 1., modified in accordance with the teachings of the present invention.

It has now been found that the operation of the operation of the apparatus of FIG. 1 may be substantially improved by simply connecting the downstream electrode 18 to ground, as indicated in FIG. 2 by the ground connection 36. This deceptively minor change has been found to not only improve the yield of tall oil soap, but also increase the density of the soap recovered from the skimming tank, thereby permitting simplified handling and storage thereof. The improvement becomes dramatically apparent in the table which follows.

accurately reflect the Zucker process (U.S. Pat. No. 4,140,609) and apparatus (U.S. Pat. No. 4,098,673). The residuals content appears to be reduced somewhat by the application of the electrostatic potential.

The final group of runs, 11-13, show the substantial improvement in residual content over the results in either of the prior groups by earth grounding the negative electrode as distinct from merely connecting the negative electrode to the negative supply line alone. In the course of a year at current prices, the value of added recoverable tall oil can amount to several hundred thousand dollars over prior art recovery rates.

In addition to the foregoing, it has been found quite unexpectedly that earth grounding the negative electrode very favorably affects the density of the recovered soap. Generally, the higher density soap is desired by the paper mill. During runs 1-4 the soap density averaged 3.8 lbs. per gallon. During runs 5-10, the soap density averaged 5.3 lbs. per gallon. During runs 11-13, the soap density averaged 7.0 lbs. per gallon.

It is believed that the reason for the improved results upon the inclusion of the ground connection 36 is that this ground connection prevents the accumulation of charge on the power supply 26, which but for the ground connection would be isolated completely from earth ground due to the isolation transformer 28.

As stated previously, it has been conventional wisdom to provide an isolation transformer 28 in order to isolate the A.C. power line 30 from the power supply 26. Because of this transformer, the power supply 26 and its output lines 32 and 34 and the electrodes 16 and 18 were completely isolated from earth ground. Consequently, it was possible for these elements to acquire an electrostatic charge relative to earth ground. It is believed that the power supply and its associated lines did,

TABLE I

| Run No. | Black Liquor Flow Rate Gal./Min. | Additional Air Flow Rate SCFH* | Air Inlet Pressure psi | Inlet Tall Oil Content Percentage | Outlet Tall Oil Content (Residuals-%) | Negative Earth Ground | Voltage RMS | AMPS |
|---|---|---|---|---|---|---|---|---|
| 1 | 4 | 0.5 | 5 | 3.55 | .92 | No | 0 | 0 |
| 2 | 4 | 0.5 | 5 | 3.72 | .95 | No | 0 | 0 |
| 3 | 4 | 0.25 | 5 | 2.35 | .67 | No | 0 | 0 |
| 4 | 4 | 0.25 | 5 | 3.30 | .85 | No | 0 | 0 |
| 5 | 4 | 0.25 | 5 | 3.06 | .73 | No | 80 | 10 |
| 6 | 4 | 0.25 | 5 | 3.18 | .72 | No | 80 | 10 |
| 7 | 4 | 0.25 | 5 | 4.17 | .64 | No | 20 | 5 |
| 8 | 5 | 0.10 | 17 | 2.19 | .70 | No | 30 | 5 |
| 9 | 5 | 0.00 | 0 | 3.45 | .72 | No | 20 | 5 |
| 10 | 5 | 0.00 | 0 | 3.95 | .68 | No | 20 | 5 |
| 11 | 5 | 0.00 | 0 | 3.21 | .57 | Yes | 18 | 10 |
| 12 | 5.6 | 0.00 | 0 | 3.59 | .55 | Yes | 18 | 10 |
| 13 | 5.6 | 0.00 | 0 | 3.59 | .45 | Yes | 18 | 10 |

Pipe Diameter (ID) = 1.75" - PVC-fiberglass reinforced.
*Standard cubic feet per hour.
Additional airflow above normal mill flow.

The foregoing table contains three groups of test runs on commercial black liquor derived from kraft paper manufacture. The objective is to reduce residuals as much as possible because residuals represent unrecovered tall oil soaps. The first group, runs 1-4, show the residuals in the skimmed tall oil without electrolytic treatment, i.e., with the power supply "off". The amount of residuals is directly dependent upon the concentration of tall oil soaps (calculated as tall oil) in the inlet and the nature of the apparatus giving rise to the by-product black liquor concentrate (normally above about 12% solids).

The next group of runs, 5-10, show the results obtained with the FIG. 1 apparatus which is believed to in fact, acquire such a charge during operation, with this acquired charge leading directly to diminished tall oil recovery efficiency.

The black liquor which flows through the pipeline 10 is electrically conductive. Consequently, in the absence of other electrical influences (i.e., when the power supply 26 is turned off) the electrodes 16 and 18 will essentially be connected to upstream and downstream metallic pipe segments (not shown) which are in turn effectively connected to earth ground, by conduction through the liquor. Consequently, prior to the power supply 26 being turned on, the positive and negative electrodes 16 and 18 are essentially at an earth ground potential. Upon the application of power to the electrodes via the power supply 26, the electrode 16 jumps to a positive potential relative to earth ground, and hence relative to the black liquor which flows through the pipeline 10. This positive potential produces the stripping of electrons from some of the anionic tall oil particles carried in the black liquor, causing them to acquire a positive charge. As stated previously, it is believed that this positive charge encourages the agglomeration of the tall oil soap particles.

The positively charged tall oil soap particles then flow downstream to the negative electrode 18, where the majority of them will reacquire the electrons which were stripped from them, again providing these particles with a net electrical charge of zero. Not all particles, however, will come in contact with the negative electrode 18, hence some of the particles which acquired a positive charge from the electrode 16 will continue to carry this positive charge downstream of the apparatus into the outlet 14. These positively charged particles will at some point come into contact with the metallic downstream outlet 14a, at which point they will regain the stripped electrons and once again acquire a net charge of zero relative to earth ground. Since there is no connection between earth ground and the power supply 26, however, there is no mechanism by which corresponding electrons can be extracted from the power supply. Consequently, the power supply will have thereby acquired a net electrical charge relative to earth ground. This net charge is negative, since more electrons are gathered by electrode 16 than are dispersed by electrode 18.

As the apparatus of FIG. 1 continues to operate, this negative electrical charge will continue to build up. The effect of this negative electrical charge is to decrease the difference in potential between the positive electrode 16 and the black liquor which flows through it. As this potential difference declines, the electrode 16 will become less and less efficient at positively charging the tall oil soap particles which pass therethrough. As less and less charge is applied to the black liquor passing through the electrode, however, the efficiency of the electrostatic agglomeration of particles also diminishes. Consequently, operation of the entire apparatus degrades with time. Although eventually an equilibrium point will be reached, the operation of the electrostatic apparatus at that equilibrium point will be much degraded over the optimum efficiency at which the apparatus could potentially operate.

Consider, now, the effect of the ground connection 36. By making this connection, the negative electrode 18 is essentially connected to the downstream piping 14, thereby, in effect, making the downstream piping 14a a continuation of the negative electrode 18. Moreover, the connection of the electrode to ground "fixes" the potential applied to the positive electrode 16 relative to ground, preventing the development of an electrical charge as the apparatus operates. Stated differently, the ground connection provides a return path to ground for the excess charge acquired at the electrode 16. Because of this, the potential applied to the positive electrode 16 remains constant throughout the operation of the apparatus, hence the efficiency of the tall oil recovery remains at a high level throughout its operation.

Figure 2A:
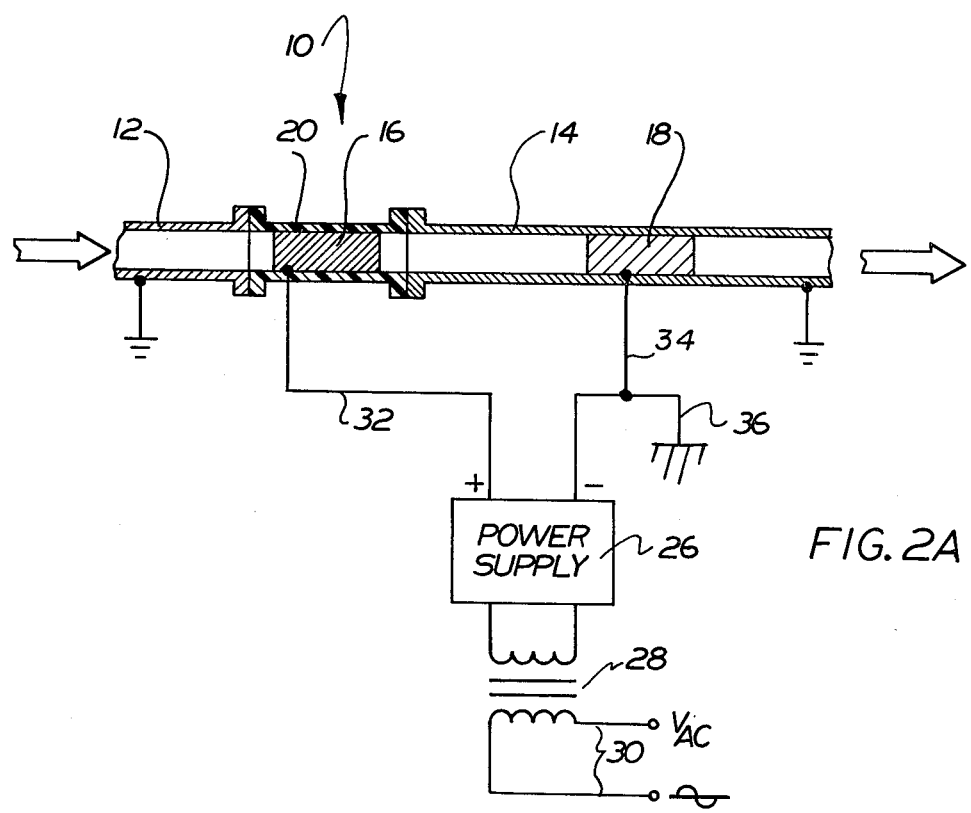
FIG. 2A is a schematic illustration of another embodiment of the invention.

It will be appreciated that a number of changes may be made to the apparatus of FIG. 2, in light of this ground connection 36. Thus, for example, it is no longer necessary to isolate the negative electrode 22 from earth ground, since it is in fact already connected to earth ground. Therefore, it is possible to insert the negative electrode 18 into a downstream location in the outlet pipe 14, to eliminate the intermediate pipe segments 22 and 24, and to directly connect the outlet pipe 14 to the insulating pipe section 20. This arrangement is shown in FIG. 2A. Since the outlet pipe 14 is already earth grounded, the connection of the electrode 18 therein automatically provides the necessary earth grounding of the electrode, eliminating the need for a separate connection exclusively for this purpose.

Figure 3:
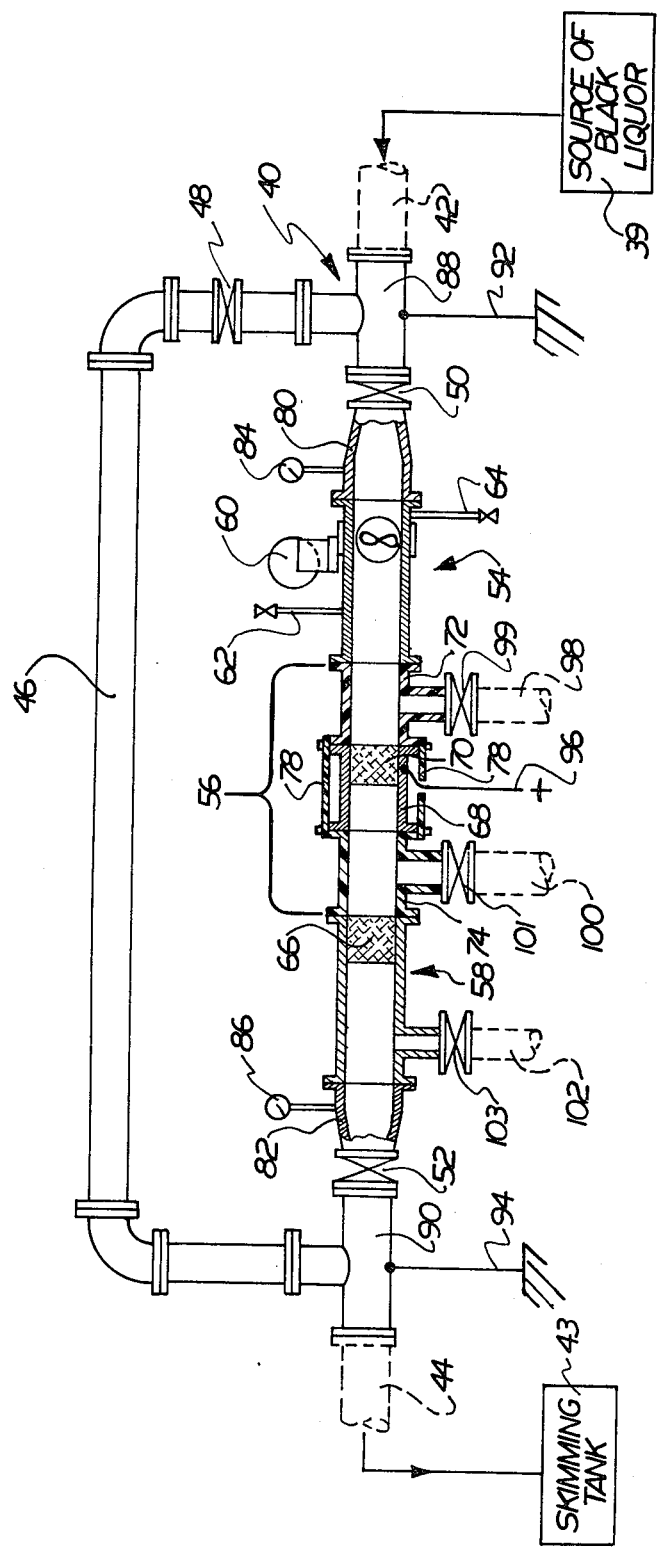
FIG. 3 is a piping layout embodying the modification shown in FIG. 2A.

FIG. 3 shows a piping layout for a preferred embodiment of the invention schematically shown in FIG. 2A and represents the best mode now known to us for practicing our invention. This embodiment has now been found to provide even better results in terms of tall oil soap recovery than the structure of Zucker shown in the aforementioned U.S. Pat. Nos. 4,098,673 and 4,140,609 modified as schematically shown in FIG. 2 of the annexed drawings. The principles of this improvement are essentially the same as described above in the Background and Summary of the Invention; the apparatus is modified. With the modified embodiment, residuals of tall oil soap have been found to be consistently under about 0.60, and averaged generally in the range of 0.55%.

Accordingly, there is shown in FIG. 3 a piping layout for an improved apparatus in accordance herewith. This piping layout includes, therefore, a segmented line generally indicated at 40, having a liquid inlet portion 42 and an exit portion 44. The inlet portion 42 communicates with a source 39 of particle-containing liquid, e.g., black liquor, as described above. The exit portion or outlet 44 communicates with a skimming tank, diagrammatically represented by the box numbered 43. A by-pass line 46 controlled by valves 48 and 50 and 52 is provided for use when it is desired to by-pass fluid around the charge affecting segments. The segmented line 40 contains 3 principal portions 54, 56, and 58. The portions 54, 56, and 58 correspond to portions 12, 20 and 14 in FIG. 2A. Portion 54 is metallic, e.g., cast iron, and contains a propeller or agitator 60 to maintain dispersion of the tall oil soap. Air inlet line 64 provides further agitation to the liquid stream. A service line 62 may also be included for attachment of other equipment e.g., a flow meter. Portion 58 is also metallic and contains a metal grid 66 in electrical communication therewith.

The central portion 56 while it can be formed of a single member 20 as shown in FIG. 2A, is conveniently formed from 3 sections, a metallic portion 68 containing a liquid stream intercepting positively chargeable grid 70, and nonconducting fiberglass reinforced resin pipe sections 72 and 74 one one each end of the portion 68. The purpose of the fiberglass reinforced resin sections 72 and 74 is to isolate electrically the grid containing portion 68 from the rest of the pipe 40. It is convenient for assembly and maintenance purposes to provide a central metallic section 68 including the grid 70. A fiberglass shield 78 surrounds the metallic portion 68 for safety reasons. The flanged insulating sections 72 and 74 are secured by any suitable means, e.g., flange bolts (not shown), to the metallic pipe sections 54 and 58. Reducers 80 and 82 fitted with pressure gauges 84 and 86 connect through valves 50 and 52 to tees 88 and 90. Tees 88 and 90 are earth grounded as shown by lines 92 and 94. Ground lines 92 and 94 may be combined as a single earth ground line if desired, and/or attached to metallic sections other than central portion 68, e.g., pipe sections 54 and 58, reducers 80 and 82, or valves 50 and 52. The pipe section 68 is connected as shown by the line 96 to the positive terminal of a conventional power supply 26 as shown in FIG. 2A. Both the metallic central portion 68 and the grid 70 become charged because of the electrical communication between the two parts 68 and 70.

Valved drain lines 98, 100, and 102 are conveniently provided for ease in draining, flushing, or back-washing individual sections 72, 68 and 74.

The assembly shown in FIG. 3 is inserted in the line leading to a settling or skimming tank 43. Where treatment is applied to black liquor from the Kraft paper making process, the apparatus is inserted in the untreated black liquor line leading from a source 39 as described above in the Background section, and communicating with the inlet end 42. The outlet 44 leads to a conventional skimming tank 43 where the agglomerated tall oil soap particles rise to the top of the liquor and are skimmed off. The source 39 and the skimmer 43 are conventional components in a Kraft paper pulping apparatus. The black liquor may be further concentrated and ignited as a fuel.

Black liquor or other liquid undergoing treatment may be by-passed around the treatment line 40 by opening valve 48 and closing valves 50 and 52.

The apparatus is operated by activating the transformer 28 (FIG. 2) and rectifying the output from 28 into + and − components. The negative terminal may be earth grounded as shown in FIG. 2A. The positively charged terminal is connected by the line 96 (FIG. 3) or 32 (FIG. 2A) to the grid containing section 68 and the grid 70. Black liquor is then conducted through the line 40. Valve 48 is closed, valves 50 and 52 are open and the valves 99, 101, and 103 in lines 98, 100, 102 are closed. The agitator 60 is turned on and air introduced through line 64. The particles on contacting the positively charged grid or electrode 68 give up electrons to the grid and become positively charged. The suspended particles on passing the grid 66 in section 58 which is at a earth ground potential, at least some of the particles become discharged or negatively charged. Through the electrostatic attraction of oppositely charged particles, the negatively charged particles are attracted strongly to the positively charged particles agglomerate and thus increase in size. Upon passing out of the apparatus through outlet 44 and into the skimmer or settling tank 43 the agglomerated particles rise to the surface and are readily skimmed off.

In a normal Kraft paper plant, the process enables the recovery of several tons per day extra of tall oil soap from which tall oil is "sprung" by known techniques (treatment with acid). The apparatus shown in FIG. 3 is surprisingly more efficient than the apparatus of Zucker (supra) modified as shown in FIG. 2 by about 10% more recovery of tall oil. The newer apparatus is less expensive to build and easier to maintain. The density of the recovered soap is also improved.

Test runs were made using the apparatus of FIGS. 2A and 3 in a paper pulp mill using black liquor from Kraft paper pulp production.

The density of the tall oil soap skimmed prior to treatment averaged 5.1 lbs. per gallon (range 4.2 to 6.0 lbs. per gallon). Four samples taken of the black liquor leaving the skimmer normally used (prior to treatment in the apparatus hereof) averaged 1.13% tall oil (range 0.75% to 1.32% tall oil). Two samples of the black liquor from the heavy liquor tank (after skimming) averaged 0.80% tall oil (range 0.75% to 0.86% tall oil). The soap skimmed from this latter tank was found to be harder to acidulate. Any residual tall oil soap left in the black liquor is normally lost. Hence, recovery of as much tall oil as possible is desired.

Using apparatus as shown in FIG. 3, air was introduced through line 64 at the rate of 0.3–0.4 Standard Cubic Feet per Hour (SCFH) in addition to the normal rate of addition of air at the Kraft paper pulp plant which plant rate ranged from 0.68 to 0.84 Standard Cubic Feet per Minute (SCFM). The black liquor feed rate from 39 (FIG. 3) to inlet 42 varied between 4.0 and 4.4 gallons per minute.

Six samples taken from the outlet 44 averaged 0.55% tall oil residual (range 0.45% to 0.65% tall oil). The density was also improved to approximately 7.0 lbs./gallon so that acidulation to spring the tall oil was easier.

For a paper mill producing 1500 tons of paper per day and using 2350 lbs. of solids per ton of pulp, an improvement in soap recovery from 0.80% down to 0.55% would amount to 4.4 tons of additional tall oil per day or 132 tons per month or about a 10% increase in tall oil production. At current prices, this amounts to approximately $900 per day.

Although the present invention has been described with respect to preferred embodiments, it will be appreciated that various rearrangements and alterations of parts may be made without departing from the spirit and scope of the present invention, as defined in the appended claims.

What is claimed is:

1. In a system for removing particles from a liquid comprising means for providing a flow path for a stream of liquid, first and second electrodes disposed in said flow path, said first electrode being located upstream of, and electrically isolated from said second electrode, and means for applying an electrical potential across said electrodes so as to cause said particles in said liquid to agglomerate, the improvement comprising means for connecting said second electrode to earth ground.

2. A system as defined in claim 1 wherein said means for connecting said second electrode to earth ground comprises said second electrode being a metallic pipe section which is directly connected to earth ground.

3. A system as defined in claim 2 wherein said second electrode includes a grid disposed in said metallic pipe section and in electrical contact therewith.

4. A system as defined in claim 1 wherein said first electrode is disposed in a metallic pipe portion and said metallic pipe portion is electrically isolated from the balance of said flow path.

5. A system as defined in claim 1 wherein said first electrode is positively charged.

6. A system as defined in claim 1 wherein said system includes a power supply having positive and negative terminals and the positive terminal is electrically connected to said first electrode.

7. A system as defined in claim 6 wherein said negative terminal is electrically connected to earth ground.

8. Apparatus for recovering tall oil soap from black liquor within which particles of tall oil soap are suspended comprising:
a conduit for providing a fluid flow path between a source of black liquor and a skimming tank wherein said black liquor is temporarily retained and tall oil soap skimmed off, at least one of said source of black liquor, conduit, and skimming tank being connected to earth ground, a first electrode disposed within said conduit and electrically isolated from earth ground, means for applying a positive D.C. electrical potential to said first electrode relative to earth ground, and a second electrode disposed within said conduit downstream of said first electrode, said second electrode being electrically connected to earth ground.

9. Apparatus as set forth in claim 8 wherein said means for applying a potential to said first electrode comprises transformer means adapted to be powered by an A.C. power source for deriving therefrom an A.C. power source which is isolated from earth ground, power supply means for deriving a D.C. potential from said isolated A.C. power source and for providing said D.C. Potential across positive and negative output lines, and means for connecting said negative output line to earth ground and said positive output line to said first electrode.

10. Apparatus as set forth in claim 9 wherein the portion of said conduit within which said second electrode is disposed is electrically conductive and is connected to said earth grounded conduit portion so as to thereby be earth grounded.

11. Apparatus for recovering tall oil soap from black liquor within which anionic particles of tall oil soap are suspended comprising:

conduit means for providing a fluid flow path between a source of black liquor and a skimming tank wherein said black liquor is temporarily retained and tall oil soap skimmed off, at least one of said source of black liquor, conduit, and skimming tank being connected to earth ground, a first electrode disposed within said conduit and electrically isolated from earth ground, means for applying a positive D.C. electrical potential to said first electrode relative to earth ground, and a second electrode comprising a metallic section of said conduit downstream from said first electrode, said section being electrically connected to earth ground.

12. A method for enhancing the extent of removal of dispersed particles of tall oil soap in a flowing confined stream of black liquor which comprises passing said stream of black liquor in contact first with a positively charged first electrode and then with a negatively charged second electrode to agglomerate said particles into larger particles said electrodes being maintained in electrical isolation one from the other, and said positively charged electrode being maintained in electrical isolation to earth ground, applying a positive D.C. potential to said positively charged electrode relative to earth ground, and applying a negative D.C. potential relative to said positively charged electrode by absorbing electrons from said second electrode into earth through a conductor electrically connected to the earth.

* * * * *